United States Patent
Kuo

(10) Patent No.: US 11,555,562 B1
(45) Date of Patent: Jan. 17, 2023

(54) PRE-STRESSED CONCRETE PIPE

(71) Applicant: Ming C Kuo, Cerritos, CA (US)

(72) Inventor: Ming C Kuo, Cerritos, CA (US)

( * ) Notice: Subject to any disclaimer, the term of this patent is extended or adjusted under 35 U.S.C. 154(b) by 0 days.

(21) Appl. No.: 17/461,480

(22) Filed: Aug. 30, 2021

(51) Int. Cl.
| | |
|---|---|
| *F16L 9/153* | (2006.01) |
| *B28B 21/62* | (2006.01) |
| *B28B 23/04* | (2006.01) |
| *F16L 49/02* | (2006.01) |
| *B28B 21/80* | (2006.01) |
| *B28B 21/56* | (2006.01) |
| *B28B 21/58* | (2006.01) |

(52) U.S. Cl.
CPC .............. *F16L 9/153* (2013.01); *B28B 21/62* (2013.01); *B28B 23/046* (2013.01); *F16L 49/02* (2013.01); *B28B 21/563* (2013.01); *B28B 21/58* (2013.01); *B28B 21/80* (2013.01)

(58) Field of Classification Search
CPC ......... B28B 21/36; B28B 21/58; B28B 21/60; B28B 21/62; B28B 23/046; B28B 21/38; B28B 21/56; B28B 21/563; B28B 21/76; B28B 21/765; B28B 21/80; B28B 21/94; F16L 9/08; F16L 9/085; F16L 9/153; F16L 51/005; F16L 25/0027; F16L 49/02
USPC ......... 138/175, 176; 285/230, 238; 277/611, 277/616, 624, 626
See application file for complete search history.

(56) References Cited

U.S. PATENT DOCUMENTS

| | | | | | |
|---|---|---|---|---|---|
| 1,735,264 | A | * | 11/1929 | Crickmer | E21B 37/10 277/439 |
| 1,976,589 | A | * | 10/1934 | Trickey | F16L 9/08 285/918 |
| 2,447,703 | A | * | 8/1948 | Jenkins | B28B 21/80 249/183 |
| 2,953,398 | A | * | 9/1960 | Haugen | F16L 21/03 277/625 |
| 3,212,797 | A | * | 10/1965 | Osweiler | F16L 21/08 285/230 |
| 3,740,061 | A | * | 6/1973 | Jensen | F16L 21/035 277/626 |
| 3,848,904 | A | * | 11/1974 | Anderson | F16L 21/005 285/915 |
| 3,915,460 | A | * | 10/1975 | Kramer | F16L 19/07 277/618 |
| 4,936,006 | A | * | 6/1990 | Creedon | B28B 21/94 264/516 |
| 5,065,795 | A | * | 11/1991 | Creedon | B28B 11/00 138/175 |

(Continued)

*Primary Examiner* — Robert K Arundale
*Assistant Examiner* — Richard K. Durden

(57) ABSTRACT

A pre-stressed concrete pipe is made by casting a concrete pipe inside a metal cylinder and then being pre-stressed by injecting solidifying compound under pressure into the boundary between the metal cylinder and concrete pipe, and includes a pair of end rings within the metal cylinder, each having a metal ring with an annular groove and an elastic band having a curved end to provide a rounded corner on the concrete pipe. After the solidifying compound is solidified, the concrete pipe retains the compression increasing its strength to withstand pressure, and moments caused by external loads. The pre-stressed concrete pipe further includes a bell ring mounted at one end and a spigot ring having a gasket ring at the other end. A bell clamp is mounted on the bell ring.

7 Claims, 3 Drawing Sheets

(56) References Cited

U.S. PATENT DOCUMENTS

| | | | | |
|---|---|---|---|---|
| 6,045,137 | A | * | 4/2000 | Friend .................. F16J 15/3252 |
| | | | | 277/560 |
| 6,076,562 | A | * | 6/2000 | Kuo ......................... F16L 9/08 |
| | | | | 138/175 |
| 8,544,505 | B1 | * | 10/2013 | Kuo .................... B28B 19/0023 |
| | | | | 138/175 |
| 2012/0080856 | A1 | * | 4/2012 | Smith .................... H02G 3/088 |
| | | | | 277/624 |

* cited by examiner

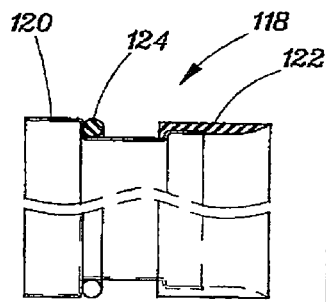 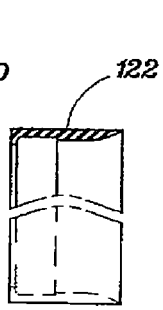 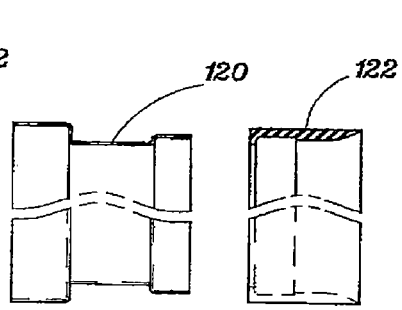 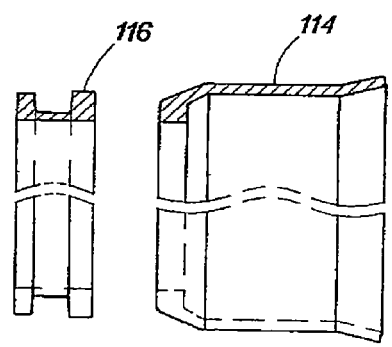
FIGURE 4  FIGURE 5  FIGURE 6  FIGURE 7  FIGURE 8
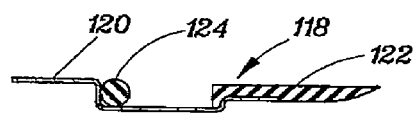 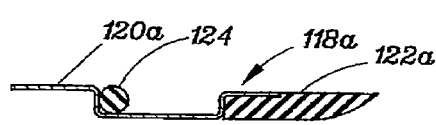
FIGURE 9  FIGURE 10
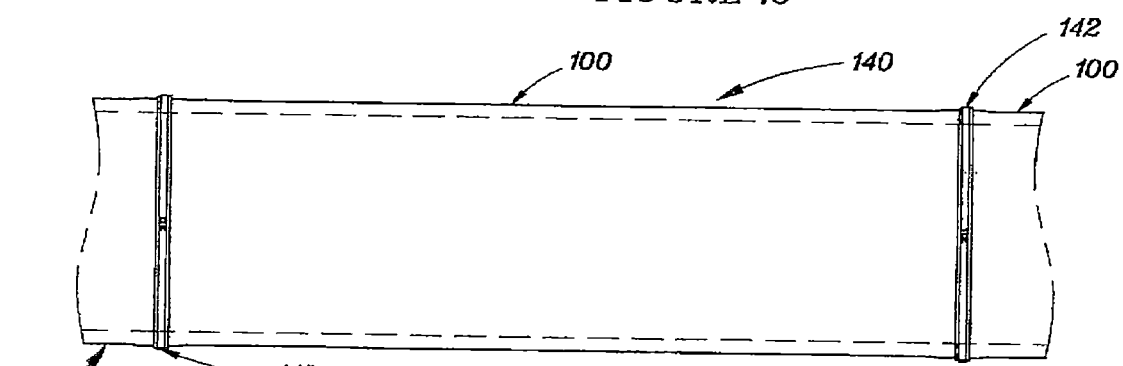
FIGURE 11
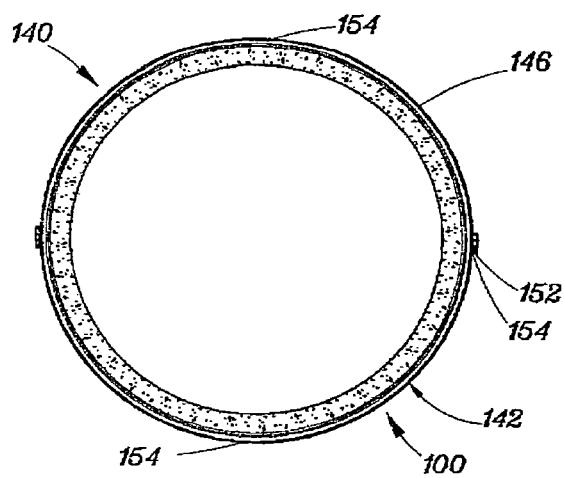
FIGURE 12
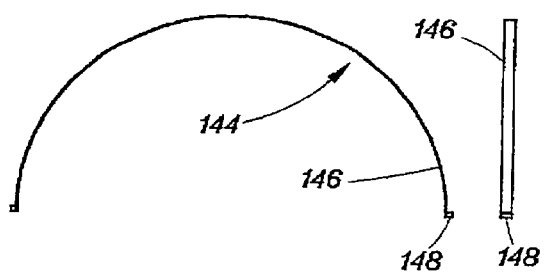
FIGURE 13
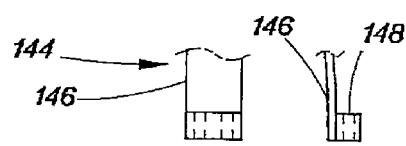
FIGURE 14

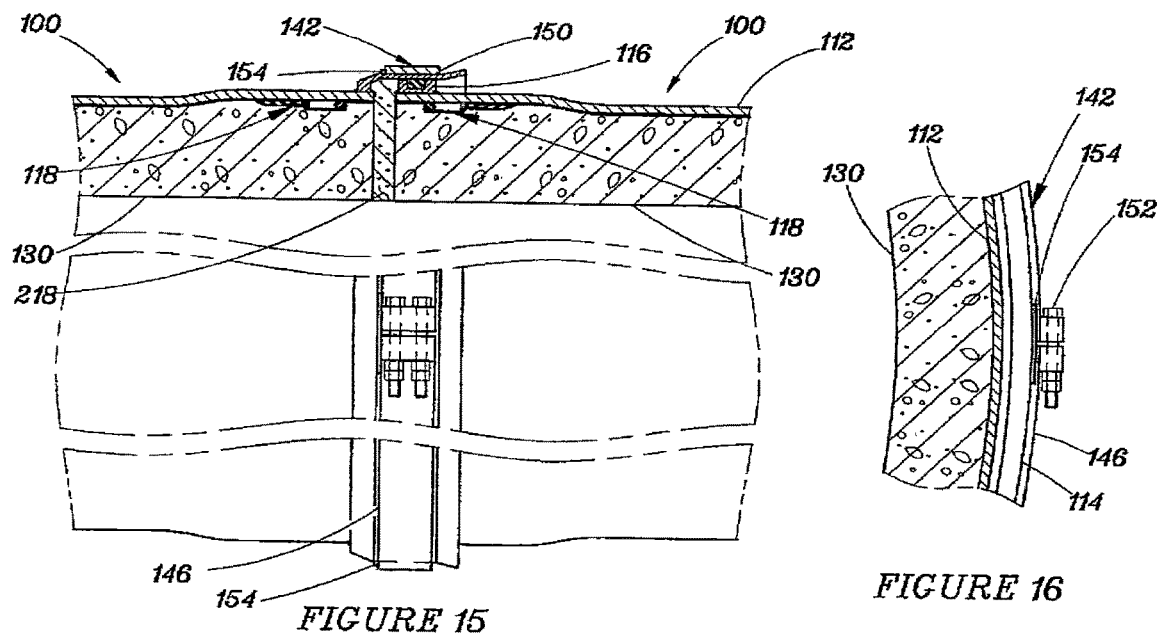
FIGURE 15
FIGURE 16
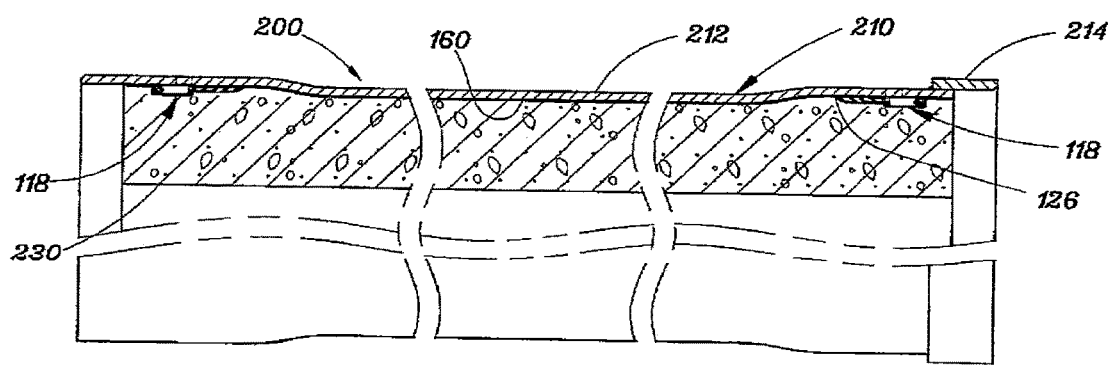
FIGURE 17
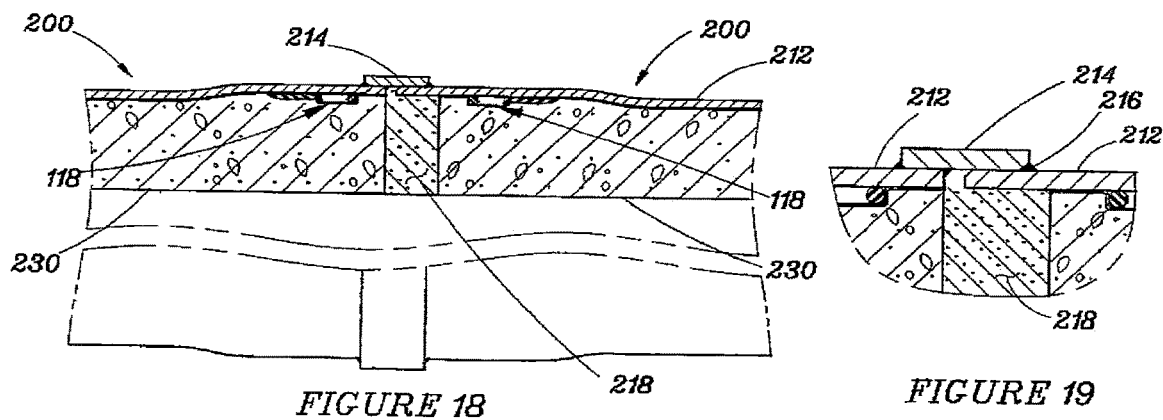
FIGURE 18
FIGURE 19

PRE-STRESSED CONCRETE PIPE

TECHNICAL FIELD

The present invention relates to concrete pipes in general. More specifically to a pipe that includes a metallic outer casing and a cast concrete tube inside with a pressurized solidifying compound between the metallic cylinder and the cast concrete tube permitting the tube to remain in compression.

BACKGROUND OF THE INVENTION

This disclosure is specifically a redesign of the pre-stressed concrete pipe presented in the U.S. Pat. No. 8,544,505.

BRIEF SUMMARY OF THE INVENTION

Many water systems rely on pressure pipelines. Among all large pressure pipes produced in the pipe industry, the Pre-stressed Concrete Cylinder Pipe (PCCP) is the only concrete pipe is pre-stressed and considered to be the best. The concrete pipe of the PCCP is pre-stressed by high tension wires wrapping around it, enabling it to utilize the full potential of its compressive strength. Under water pressures the inner face of the concrete pipe always remains in compression to protect the steel cylinder of the PCCP, enabling the pipe to outlast other kinds of pipes.

However, to make a PCCP the pre-stressing wires have to be an ultrahigh strength spring-grade steel, which is prone to hydrogen embrittlement, and requires cathodic protection and periodic inspection. Even with the protection measures taken, pipelines using the PCCP still have had many accidents in the past caused by wire corrosion. A single wire breakage in a PCCP could shut down an entire pipeline for major repair.

The pre-stressed concrete pipe presented in U.S. Pat. No. 8,544,505, is a new kind of pre-stressed concrete pipe. The pipe is made by casting a concrete pipe inside a steel cylinder and then injecting solidifying compound such as epoxy resin under pressure between them putting the concrete pipe in compression. After the compound is solidified, the concrete pipe will remain in compression enabling to transmit water under pressures and take the moments under soil loads. Unlike the PCCP having two concrete cores separated by a steel cylinder wall, the new pipe has a single concrete core encased by a steel cylinder, enabling the pipe to utilize the maximum allowable stresses of both steel and concrete simultaneously. In addition, the entire concrete wall and the layer of epoxy resin protect the steel wall from corrosion, and the epoxy's bonding also makes the steel cylinder and concrete pipe to become a more desired integral pipe providing the pipe with tremendous strength and rigidity not only in the radial direction, but also along its length. The steel used in the new pipe is an industry grade; therefore the standard corrosion protection on the surface of the pipe is sufficient. In many ways, the pipe is superior to the PCCP, and does not have the weakness of the PCCP.

To appreciate the magnitude of improvement on the pipe strength by pre-stressing, the line-load capacity of a pipe is to be presented in the following. With the pipe supported at its bottom, its line-load capacity is the load acting on its top to have the inner face of the concrete wall at its bottom reaching the tensile strength of the concrete. Above the line-load capacity the concrete wall will begin to crack. Some concrete pipe companies assume that the concrete with compressive strength 4500 psi (pounds per square inch) has the tensile strength 402 psi.

In a test design with a given maximum water pressure and soil loads, a 84 inch pipe (inside diameter of the pipe) requires a 0.4375 inch thick steel cylinder and a 4.5 inch thick concrete wall cast inside the steel cylinder. The design requires the pipe to be pre-stressed with epoxy pressure 200.4 psi to put the concrete wall 2, 180 psi in compression and the steel wall 21, 200 psi in tension. Before pre-stressing, the 84 inch pipe has a line-load capacity 677 pounds per linear foot of pipe length, but after pre-stressing it has the line capacity 11,586 pounds per linear foot, about 17 times increase in strength. With the same loading conditions, after pre-stressing a 48 inch pipe has about 10 times increase in its line-load capacity, and a 120 inch pipe has 45 times. The larger a pipe is, the greater its strength increases by pre-stressing.

The analytical results also verify the known fact that the widely-used cement-lined steel pipes are very flimsy. The steel pipes have the same design as the pre-stressed concrete pipe, with a cement wall to protect the steel wall from corrosion, but without any pre-stressing on the cement. Therefore, the steel pipes require more elaborate bedding and backfilling processes during pipe laying operation in trench to keep their roundness. Besides, the steel pipes will not last as long as the pre-stressed concrete pipe and might require costly rehabilitation during their serving life.

However, the pre-stressed concrete pipe presented in the previous patent is not viable at the pipe joint. In the following description, the names of the parts of a pipe in the previous patent are to be changed to the names commonly used by the pipe industry. The belled second end mentioned in the previous patent is to be renamed as bell ring in this disclosure, the annular ring as spigot ring, and the annular offset member as end ring.

The vital mistake in the previous concept is the bell ring, which is an integral part of the steel cylinder. Most of large steel cylinders are likely made of a plate. Because of the imperfection of steel plate and also rolling and welding processes, the inner surface of the integral bell end of the pipe in the previous patent will never achieve the roundness and smoothness to provide the needed sealing at the pipe joint. Besides, the bell ring overhangs from the end of the concrete pipe and has less rigidity than the pipe. Even though after engaging with the mated pipe the bell ring will stretch passively in the circumferential direction creating pre-loading at the pipe joint, there is no accurate way to control its magnitude with certainty that the bell ring will seal the pipe joint under water pressures.

To provide a good fit at the pipe joint, both bell ring and spigot ring on the pipe must be made as separate parts and then welded onto the outer face of the steel cylinder. Therefore, both end rings will fit with the inside face of the steel cylinder and hence become identical. And the spigot ring will have a simple cross section of rectangular with a groove for a sealing gasket ring, making it easier to fabricate.

To ensure no leakage at the pipe joint with certainty, a bell clamp will be installed on the bell ring of the pipe and tightened at the installation of a pipeline to create radial forces counteracting water pressures. The bell clamp is very simple and its clamping forces are controllable, and can be retightened as needed even after a pipeline is pressure tested before backfilling. The induced hoop stresses on the bell ring during the engagement with the spigot ring of the mated pipe before installing the bell clamp will provide extra assurance of no leakage at the pipe joint.

With the bell clamp acting on the pipe joint, the thickness of the bell ring may be just adequate for the axial reaction by water pressures, and have rigidity for making a good joint and pipe laying operation. One size of the bell ring could be used for a range of pipe sizes. Similarly, the two end rings could also have one size for a range of cylinder sizes, simplifying the cylinder fabrication. The finite element method should be used to obtain optimal dimensions for both bell ring and end ring, and the required clamping forces for the bell clamp.

To create a pre-stressed concrete pipe, first make a steel cylinder weldment and then cast a concrete pipe inside the cylinder weldment. After the concrete is fully cured, place the pipe in the vertical position and inject epoxy resin under pressures into an annular space formed in each end ring. This process enables the epoxy to fill up the annular space first, and then penetrate lengthwise into the inner face of the cylinder, putting the concrete pipe in compression. After the epoxy is solidified, the concrete pipe will retain the compression. As a last step of the production, a corrosion protecting coat must be applied on the surface of the pipe.

The pipelines using pipes with steel outer casing traditionally have two configurations at their joints: seal joint and weld joint. The pipe described so far is a seal joint pipe, which uses an elastic seal to prevent leakage at its pipe joint. In this disclosure, the weld-joint pipes will also be included. A weld-joint pipe has a joint ring at the front end of its steel cylinder and the rear end of the cylinder engages with the joint ring of the mated pipe in the field and then weld together to seal the pipe joint.

These improvements over the previous invention will become apparent from the subsequent detailed description of the preferred embodiment and the appended claims taken in conjunction with the accompanying drawings.

BRIEF DESCRIPTION OF THE DRAWINGS

In the following list, FIGS. 1 through 16 are for the seal joint pre-stressed concrete pipe, and FIGS. 17 through 19 for the weld-joint pre-stressed concrete pipe. The identification of items and parts in the figures is defined as follows. A single part is identified by its designated number with a line touching the part. An item consists of parts and is identified by its designated number and a line with an arrow head touching one of its parts. An item having a line with an arrow head pointing to a figure without touching any part means the item comprising more than one part and item in the figure.

FIG. 1 is an isometric view of the seal joint pre-stressed concrete pipe from its rear end, without the gasket ring in the spigot ring, and the bell clamp on the bell ring.

FIG. 2 is a side view of the steel cylinder weldment of the seal joint pre-stressed concrete pipe, with a cross-sectional view at its upper part.

FIG. 3 is a side view of the seal joint pre-stressed concrete pipe, with a cross-sectional view at its upper part. The epoxy injection heads and pressure gauges are shown in phantom lines.

FIG. 4 is a side view of the end ring, with a cross-sectional view at its upper part.

FIG. 5 is a side view of the metal ring, with a cross-sectional view at its upper part.

FIG. 6 is a side view of the elastic band, with a cross-sectional view at its upper part.

FIG. 7 is a side view of the spigot ring, with a cross-sectional view at its upper part.

FIG. 8 is a side view of the bell ring, with a cross-sectional view at its upper part.

FIG. 9 is the cross section of the end ring.

FIG. 10 is the cross section of the end ring with the elastic band bonded on the inner face of the inner flange of the metal ring.

FIG. 11 is a side view of the pipeline made of the seal-joint pre-stressed concrete pipe.

FIG. 12 is a cross-sectional end view of the pipeline of the seal joint pre-stressed concrete pipe.

FIG. 13 is a rear view of the half-clamp and its side view.

FIG. 14 is a partial rear view of the half-clamp and its side view.

FIG. 15 is a partial side view of the seal joint pre-stressed concrete pipe at its pipe joint, with a cross-sectional view at its upper part.

FIG. 16 is a partial cross-sectional rear view of the seal joint pre-stressed concrete pipe at its pipe joint.

FIG. 17 is a side view of the weld-joint pre-stressed concrete pipe, with a cross-sectional view at its upper part.

FIG. 18 is a partial side view of the weld-joint pre-stressed concrete pipe at its pipe joint, with a cross-sectional view at its upper part.

FIG. 19 is a partial cross-sectional side view of the weld-joint pre-stressed concrete pipe at its pipe joint.

DETAILED DESCRIPTION OF THE INVENTION

Figure 1:
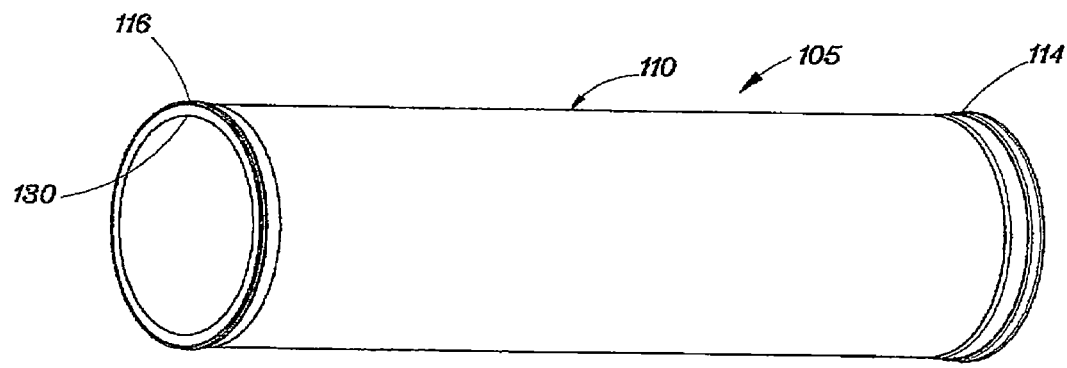
Figure 2:
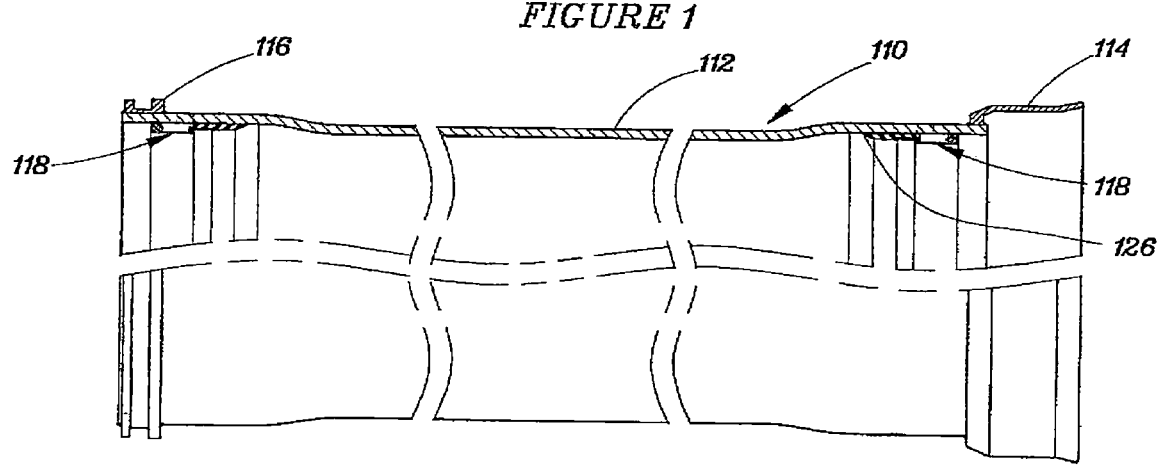
Figure 3:
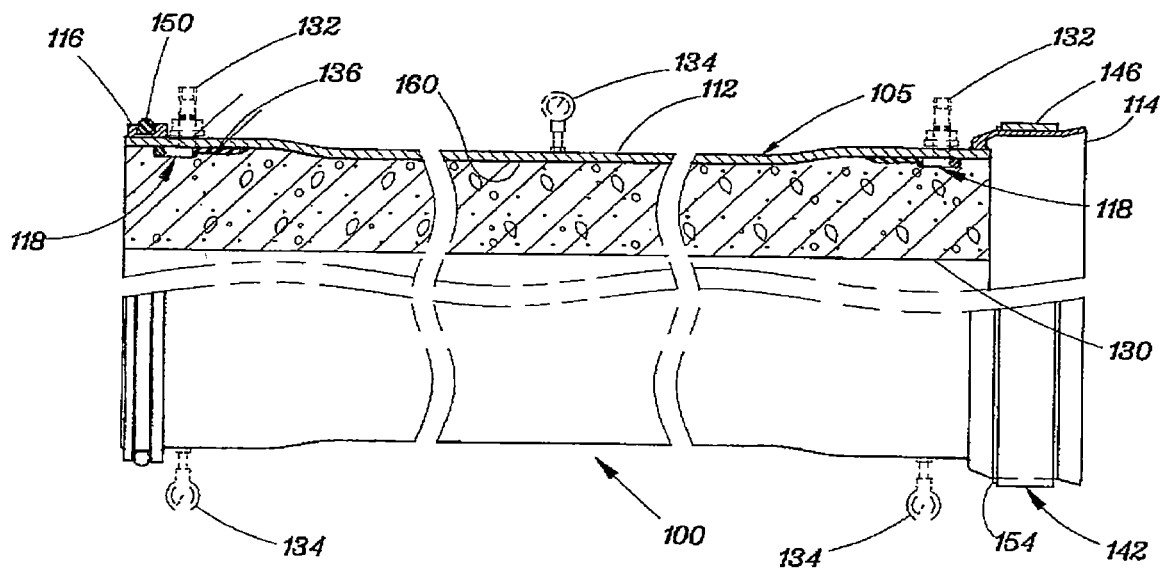

Seal-Joint Pre-Stressed Concrete Pipe:

The main pictorial views are shown in FIGS. 1 and 3. A seal joint pre-stressed concrete pipe 100 comprises a pre-stressed concrete pipe 105, a bell clamp 142, and a round gasket ring 150. The pre-stressed concrete pipe 105 consists of a cylinder weldment 110, a concrete pipe 130, epoxy resin 160, de-bonding agent, and adhesive tape 126 as shown in FIGS. 1 and 3. And the cylinder weldment 110 consists of a steel cylinder 112, two end rings 118, a bell ring 114, and a spigot ring 116. Before making the cylinder weldment 110, both ends of the cylinder 112, the end rings 118, the bell ring 114, and the spigot ring 116 all must be sized to the required dimensions, and then put together with waterproof weld as shown in FIG. 2.

Steel Cylinder:

The main pictorial view is shown in FIG. 2. The steel cylinder 112 could be made either with a plate helically rolled and welded in a continuous process or with a rectangular plate formed into round sections and longitudinally welded. The fabrication of the steel cylinder is a well-known technology. Both ends of the steel cylinder 112 are stretched to the same diameter with the required dimensions for mounting the end rings 118 and hence become slightly larger than the cylinder. If there is any need, one end of the cylinder can be made larger than the other. The cylinder 112 should have at least two thread holes positioned diametrically opposite, and located near each of its ends for installing an injection head 132 and a pressure gauge 134 respectively. And another thread hole is located halfway along the length of the cylinder for installing a pressure gauge 134.

Bell Ring:

The main pictorial views are shown in FIGS. 2, 3, and 8. The bell ring 114 is installed on the front end of the cylinder 112 and made of formed steel bar with the required cross-section. Its inner section is conical and the inside diameter of the inner end is sized to fit with the outside diameter of the cylinder 112 and join together with waterproof weld. The middle section of the bell ring 114 is cylindrical having its inner face to fit with the outer face of the spigot ring 116. The outer section of the bell ring 114 is also conical taper working as a guide during pipe installation. The dimensions of the bell ring should be determined using the finite element method based on water pressures and the rigidity required for pipe laying operation.

Spigot Ring:

The main pictorial views are shown in FIGS. 2, 3, and 7. The spigot ring 116 is installed on the rear end of the cylinder 112 and made of formed steel bar with the required cross-section including a seal groove for mounting the round gasket ring 150. The inner face of the spigot ring 116 is sized to fit with the outer face of the cylinder 112 and join together with waterproof weld.

End Ring:

The main pictorial views are shown in FIGS. 2, 3, 4, 5, 6, and 9. The cylinder weldment 110 requires two end rings 118, one located at each end of the steel cylinder 112 and welded to the inner face of the cylinder 112. During pre-stressing the concrete pipe 130 cast inside the steel cylinder 112, the end rings 118 seal both ends of the steel cylinder 112 preventing epoxy resin from leaking through the ends of the steel cylinder 112.

The end ring 118 consists of a metal ring 120, an elastic band 122, and a round gasket ring 124 as shown in FIGS. 4 and 9. The metal ring 120 is made of steel plate and has a channel groove in the middle and a flange at each end. The groove of the metal ring 120 will create an annular space to distribute the epoxy resin evenly around the cylinder end during pre-stressing. The outer flange of the metal ring 120 is sized to fit with the inner face of the cylinder 112 and joined together with waterproof weld. The inner flange of the metal ring 120 is recessed radially with an offset for mounting the elastic band 122. The channel groove of the metal ring 120 must be located longitudinally at where an epoxy injection head 132 is positioned as shown in FIG. 3. The elastic band 122 is made of rubber-like materials such as neoprene and has a groove at its inner face to bond on the entire outer face of the inner flange of the metal ring 120. At its inner end the elastic band 122 has a circular curve starting from its inner face so that after casting concrete, the concrete wall 130 will have a round corner to minimize stress concentration.

Another configuration of the end ring 118a is shown in FIG. 10. The inner flange of the metal ring 120a offsets slightly from the outer flange and the elastic band 122a is bonded to the inner face of the inner flange of the metal ring 120a. The metal ring 120a is easier to fabricate, but the elastic band 122a is harder to bond on the metal ring 120a. Besides, there is a critical problem with the end ring 118a. If there are voids in the concrete pipe right under the inner end of the metal ring 120a, during pre-stressing, the pressurized epoxy resin would tear the bonding of the elastic band 122a and leak out. If the concrete pipe can be cast without any voids in it and there is an easy way to bond the elastic band 122a, the end ring 118a could be an alternate. In this disclosure, the end ring 118a is not considered.

During pre-stressing the concrete pipe 130 with epoxy resin, the steel cylinder 112 will expand radially away from the concrete pipe 130 causing each metal ring 120 to deform. To ensure no leakage from each metal ring 120, the inner end of the metal ring 120 must always stay in contact with the concrete wall 130 during pre-stressing. Therefore, each metal ring 120 has to be sufficiently wide axially and thin, and made of soft mild steel to prevent from cracking due to the deformation while minimizing the separated depth at the pipe end. The thickness and dimensions of the metal ring 120 should be determined with the finite element method.

The round gasket ring 124 is placed against the outer web of the metal ring 120. The gasket ring 124 serves as an extra protection to prevent epoxy resin from leaking out if the weld on the metal ring 120 cracked during pre-stressing, especially for large pipes. To prevent the gasket ring 124 from burning during welding the metal ring 120 on the steel cylinder 112, the axial width of the outer flange of the metal ring 120 should be sufficient, and the weld on the metal ring 120 should keep to minimum and be adequately cooled.

After installing in a steel cylinder 112, each end ring 118 must have a small gap between the outer face of its elastic band 122 and the inner face of the steel cylinder 112 for epoxy resin to flow longitudinally into the steel cylinder 112. Before casting concrete, the inner end of each elastic band 122 must seal to the inner face of the cylinder 112 with adhesive tape 126 to prevent wet cement from leaking into the annular space of the metal ring 120 during concrete casting.

Casting of Concrete Pipe:

The main pictorial view is shown in FIG. 3. Before casting the concrete pipe 130 inside the steel cylinder 112, the inner face of the steel cylinder 112 must be coated with de-bonding agent to prevent the concrete wall from sticking to the inner face of the steel cylinder 112 allowing epoxy resin to easily permeate into the cylinder during pre-stressing. It is important to select the de-bonding agent that will not react with epoxy. The casting of concrete can be done with either vertical gravity cast or centrifugal spin cast processes. Ends of the concrete pipe should be located at the ends of the cylinder 112 respectively.

After the concrete is fully cured, the pre-stressed concrete pipe 105 can be placed in the vertical position with its bell end resting on a base. The epoxy resin 160 is injected through an injection head 132 with built-in check valve installed at each end of the steel cylinder 112, into the annular space in each metal ring 120. The air inside the annular space must bleed out first from the pressure gauge hole before pumping the epoxy resin under pressures. A pressure gauge 134 is installed at the diametrically opposite side of each injection head 132, and another pressure gauge 134 at halfway along the length of the pipe as shown in FIG. 3. During the epoxy injection under pressures, vibration to the steel cylinder 112 from outside may be needed to help the epoxy resin 160 permeate evenly and quickly throughout the entire pipe. Meanwhile, handheld ultrasonic devices may be used to detect the penetration of epoxy and check the epoxy's uniformity.

The pumping of epoxy resin 160 can stop when the epoxy reaches the required pressure throughout the entire pipe, and the check valve in each injection head 132 will hold the pressure. After the epoxy resin 160 is completely solidified, the concrete pipe 130 will retain the required compression. The shrinkage of the epoxy resin must be taken into consideration. The gap created at each end of the pre-stressed concrete pipe 105 by the deformed metal ring 120 must fill with epoxy resin. Each thread hole for the injection heads 132 and pressure gauges 134 should be plugged with a thread bar of the same size, welded to the cylinder, and ground smooth if necessary. If a pipe 105 is tested with water instead of epoxy resin, after testing the pressurized water must bleed out from the pressure gauge hole located halfway along the length of the steel cylinder 112 to prevent the elastic bands 122 in the end rings 118 from being blown out.

After the epoxy resin in the pipe is fully solidified, a corrosion protecting coat must be applied on the pipe 105.

And then the bell clamp 142 is installed on the bell ring 114 and the round gasket seal 150 placed in the spigot ring 116, for the pipe 105 to become a seal-joint pre-stressed concrete pipe 100. The inner face of the bell clamp 142 and its bolts 152 must be lubricated. When the pipes 100 are laid together to form a pipeline 140, the bell clamp 142 on each pipe must be tightened to the required force to ensure no water leakage from the gasket ring 150.

For a test pipe, strain gauges may be installed at various key spots on the steel cylinder 112 to measure hoop and axial strains. The measurements from the hoop strain gauges can be used to check with the analytically-predicted stresses based on the epoxy pressures. Meanwhile, the axial strain gauges could likely reveal some axial tensile stresses in the steel cylinder 112 due to the imperfection of the cylinder 112 and its lengthwise contraction by pre-stressing. The induced axial tensile stresses in the steel cylinder 112 imply the concrete pipe having reactive axial compressive stresses, which are a beneficial side effect, but very uncertain because every fabricated steel cylinder 112 has different degrees of uncontrollable imperfection.

Bell Clamp and Clamp Guides:

The main pictorial views are shown in FIGS. 12 through 16. The bell clamp 142 is to prevent the bell ring 114 of the pre-stressed concrete pipe 105 from expanding radially away from the spigot ring 116 of the mated pipe under water pressures to maintain the sealing at the pipe joint.

After the pre-stressed concrete pipe 105 is made, the bell clamp 142 is mounted on the cylindrical section of the bell ring 114 with the outer side of the bell clamp 142 located at the tapered end of the bell ring 114. The bell clamp 142 consists of two round half-clamps 144 and two bolt joints 152. Each bolt joint could have two bolts 152 and be located on the horizontal plane through the center of the pipe 105. Each half-clamp 144 is a weldment and could be a semicircular band made of flat steel bar 146 with a clamp block 148 welded at each end. Each clamp block 148 has two bolt holes in the tangential direction. After tightened in the field, each bolt joint of the bell clamp 142 must have a gap to ensure that the clamping force is acting on the bell ring 114.

There are four clamp guides 154 mounted on the bell ring 114 against the inner side of the bell clamp 142 to keep the bell clamp axially in the right position. One clamp guide 154 is located at each of the clamp bolt joints, one on the top of the bell ring 114, and one on the bottom. The clamp guides 154 must be installed on the bell ring 114 during the fabrication of the cylinder weldment 110.

Pipe Joint of Seal-Joint Pipe:

The main pictorial views are shown in FIGS. 15 and 16. During pipeline lay operation, after two seal joint pipes 100 are joined together, the gasket ring 150 on the front pipe must be located at the cylindrical section of the bell ring 114 on the rear pipe. And there is an adequate gap between the ends of the two concrete pipes 130. The gap is then filled with grout 218. The axial dimensions of the bell ring 114 and the gaps between the two mated pipes should follow the standard used by the pipe industry.

Weld-Joint Pre-Stressed Concrete Pipe:

The main pictorial views are shown in FIGS. 17, 18, and 19. Many pipelines having steel outer casing in their pipes may require their pipe joints to be welded together to prevent leakage. For the application, a weld-joint pre-stressed concrete pipe 200 is to be included in this disclosure. The weld-joint pre-stressed concrete pipe 200 is almost the same as the pre-stressed concrete pipe 105 in the seal joint pipe 100, except its front end has a joint ring 214 instead of the bell ring 114, and its rear end does not need the spigot ring 116. Therefore, the weld-joint pre-stressed concrete pipe 200 consists of a cylinder weldment 210, a concrete pipe 230, epoxy resin 160, de-bonding agent, and adhesive tape 126. And the cylinder weldment 210 consists of a steel cylinder 212, two end rings 118, and a joint ring 214 as shown FIG. 17.

Both ends of the steel cylinder 212 must be sized to the same diameter. The rear end of the cylinder 212 has a taper corner at its outer face to work as a guide during pipe laying operation. The joint ring 214 is a round ring made of a flat steel bar and its inner diameter is sized to fit with the outer diameter of the cylinder 212. The rear part of the joint ring 214 joins to the front end of the cylinder 212 with waterproof weld. The front end of the joint ring 214 extends beyond the front end of the cylinder 212 for engaging with the rear end of the cylinder 212 on the mated pipe 200 at the pipe joint. The front end of the joint ring 214 also has a taper corner at its inner face to work as a guide during pipe laying operation. The rear end ring 118 is located in front of the rear end of the cylinder 212 at a required distance. The rear end of the cylinder 212 will engage with the joint ring 214 of the mated pipe.

The concrete pipe 230 is then cast inside the cylinder weldment 210, with its ends located at the outer ends of the end rings 118, and then pre-stressed with epoxy resin 160. The procedure of making the weld-joint pre-stressed concrete pipe 200 is same as making the seal joint pre-stressed concrete pipe 105. The dimensions of the joint ring 214 should be determined with the finite element method.

Pipe Joint of Weld-Joint Pipe:

The main pictorial views are shown in FIGS. 18 and 19. After two weld-joint pre-stressed concrete pipes 200 are joined together, the front part of the joint ring 214 on the rear pipe engages with the rear part of the cylinder 212 of the mated pipe. And the front end of the joint ring 214 should be located behind the rear end of the concrete pipe 230 on the front pipe, allowing the front end of the joint ring 214 to be welded to the steel cylinder 212 of the front pipe without disturbing the concrete wall 230 in the front pipe. The weld must be waterproof. There must be an adequate gap between the cylinder end 212 of the front pipe and the front end of the concrete wall 230 in the rear pipe. The gap between the ends of the concrete pipes 230 is then filled with grout 218.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

Addendum Pre-Stressed Concrete Pipe

Element Designation 100 seal joint pre-stressed concrete pipe, 105 pre-stressed concrete pipe, 110 steel cylinder weldment, 112 steel cylinder, 114 bell ring, 116 spigot ring, 118 end ring, 118a end ring, 120 metal ring, 120a metal ring, 122 elastic band, 122a elastic band, 124 round gasket ring, 126 adhesive tape, 130 concrete pipe, 132 epoxy injection head, 134 pressure gauge, 140 pipeline, 142 bell clamp, 144 round half-clamp, 146 semicircular bar, 148 clamp block, 150 round gasket ring, 152 clamp bolt. 154 clamp guide, 160 epoxy resin, 200 weld-joint pre-stressed concrete pipe, 210 steel cylinder weldment, 212 steel cylinder, 214 joint ring, 218 grout. 230 concrete pipe.

The invention claimed is:

1. A pre-stressed concrete pipe comprising:
a metallic cylinder having an inner surface, an outer surface, a first end, a second end, and a plurality of threaded holes located near each of the first and second ends;
a spigot ring having an outer face comprising a seal groove, and an inner face hermetically welded to the outer surface of the metallic cylinder at the first end thereof;
a round gasket ring mounted in the seal groove of the spigot ring;
a bell ring having an inner section comprising a conical exterior face and an interior face hermetically welded to the outer surface of the metallic cylinder at the second end thereof, a cylindrical middle section having an inner face configured to receive a spigot ring of another pipe, and an outer section comprising a conical taper configured to serve as a guide for inserting said spigot ring of another pipe into said cylindrical middle section;
a cast concrete pipe within said metallic cylinder;
a pressurized solidifying compound disposed between said metallic cylinder and said cast concrete pipe;
a first annular end ring embracing the inner surface of the metallic cylinder near the first end thereof and a second annular end ring embracing the inner surface of the metallic cylinder near the second end thereof, wherein the first and second annular end rings are identical in form and each comprises a metal ring and an elastic band,
said metal ring comprising a longitudinal outer flange hermetically welded to the inner surface of the metallic cylinder at the respective end thereof, a longitudinal inner flange radially recessed from the inner surface of the metallic cylinder, and a radially-outward opening groove portion positioned between the outer flange and the inner flange, wherein the groove portion and the inner surface of the metallic cylinder define an annular space,
wherein the annular space defined by the metal ring of the first annular end ring is configured to communicate with the plurality of threaded holes located near the first end of the metallic cylinder, and
wherein the annular space defined by the metal ring of the second annular end ring is configured to communicate with the plurality of threaded holes located near the second end of the metallic cylinder,
said elastic band comprising a longitudinal outer end, a longitudinal inner end, a radially outer face, and a radially inner face, said radially inner face comprising a circumferential groove spaced from the longitudinal outer end and the longitudinal inner end,
wherein said circumferential groove is bonded to and covers an entire radially outer face of the longitudinal inner flange of the corresponding metal ring so that the elastic band is partially disposed between the longitudinal inner flange and the inner surface of the metallic cylinder,
wherein a portion of the radially inner face between the circumferential groove and the longitudinal outer end is disposed within the radially-outward opening groove portion of the corresponding metal ring,
wherein a portion of the radially inner face proximate to the longitudinal inner end is formed as a curve starting at an intermediate tangent point of the radially inner face between the circumferential groove and the longitudinal inner end, and curving gradually outward such that the curve meets the radially outer face at the longitudinal inner end, the curve configured to provide a round corner on said cast concrete pipe to reduce stress concentration,
wherein said pressurized solidifying compound is disposed between said metallic cylinder and said cast concrete pipe by injecting said solidifying compound at a pre-determined pressure through at least one of the plurality of threaded holes located near each of the first and second ends, the injected solidifying compound flowing from the threaded holes into the annular spaces defined by the first and second annular end rings, through a gap formed between the inner surface of the metallic cylinder and the radially outer face of the elastic bands of each annular end ring, and then between the metallic cylinder and the cast concrete pipe, putting said cast concrete pipe in compression and retaining the compression after said solidifying compound has solidified,
wherein the elastic bands serve to seal between the metal rings of the annular end rings and the cast concrete pipe so as to prevent the pressurized solidifying compound from leaking through the first and second ends of the metallic cylinder during injection.

2. The pre-stressed concrete pipe of claim 1, wherein the pressurized solidifying compound is an epoxy resin compound.

3. The pre-stressed concrete pipe of claim 1, further comprising adhesive tape configured to seal between the longitudinal inner end of the elastic bands and the inner surface of the metallic cylinder during casting of the concrete pipe to prevent concrete from flowing into the annular spaces formed by the annular end rings.

4. The pre-stressed concrete pipe of claim 1, wherein each annular end ring further comprises a round gasket ring disposed within the radially-outward opening groove portion, proximate the longitudinal outer flange, configured to prevent the pressurized solidifying compound from leaking between the longitudinal outer flange and the inner surface of the metallic cylinder during injection in the event of failure of the hermetic weld therebetween.

5. A pipeline comprising a plurality of the pre-stressed concrete pipes according to claim 1.

6. The pre-stressed concrete pipe of claim 1, further comprising a bell clamp installed on the bell ring, the bell clamp comprising at least one bolt joint, whereby when said spigot ring of another pipe is inserted into the bell ring, tightening of the bell clamp forms a watertight joint between the bell ring and said spigot ring of another pipe.

7. A pipeline comprising a plurality of the pre-stressed concrete pipes according to claim 6.

* * * * *